Feb. 4, 1958     J. M. KLAASSE     2,822,515
SPINNING TYPE MAGNETOMETER
Filed July 13, 1955     3 Sheets-Sheet 1

INVENTOR
JAMES M. KLAASSE

BY
ATTORNEYS

Feb. 4, 1958    J. M. KLAASSE    2,822,515
SPINNING TYPE MAGNETOMETER
Filed July 13, 1955    3 Sheets-Sheet 2

A 
FREQUENCY q
FREQUENCY 2p

B   $b=0°$   $e_{2p}=KH \cos c \cos 2pt$

C   $b=c=90°$   $e_{2p}=KH[\cos qt \cosh h + \sin qt \sinh h]\cos 2pt$
0°  90°  180°  270°  360° qt

D   $b=c$   $45° < c < 90°$   $\frac{1}{2} < \sin^2 c < 1$

E   $b=c=45°$

F   $b=c < 45°$   $0 = \sin^2 c < \frac{1}{2}$

G   MAGNETIC NORTH $\frac{t_1}{t_2} \times 360° =$ MAGNETIC DECLINATION

INVENTOR
JAMES M. KLAASSE

BY
ATTORNEYS

United States Patent Office 2,822,515
Patented Feb. 4, 1958

2,822,515

SPINNING TYPE MAGNETOMETER

James M. Klaasse, Chevy Chase, Md.

Application July 13, 1955, Serial No. 521,939

12 Claims. (Cl. 324—43)

(Granted under Title 35, U. S. Code (1952), sec. 266)

The invention described herein may be manufactured and used by or for the Government of the United States of America for governmental purposes without the payment of any royalties thereon or therefor.

This invention relates to universal magnetometers and more particularly to a spinning inductor type magnetometer which is capable of making airborne measurements of the direction as well as the magnitude of the earth's magnetic field.

It is desirable that a magnetometer provide an indication of the horizontal and vertical components of the earth's magnetic field and also measure the angle of magnetic declination, which is the angle in the horizontal plane between true and magnetic north. One attempt to solve this latter problem has been the use of a three-element gyro-slaved universal magnetometer in which the three inductors are arranged along the three orthogonal axes of the inductor mounting. This system utilizes two saturable inductors placed at right angles to each other and continuously measures the magnetic field components along the axes of the inductors. A third inductor is mounted perpendicular to the first two and is used to supply information to a servo system for orientation purposes.

The present invention utilizes a single spinning inductor in place of the prior three element devices to thus eliminate many of the errors inherent with misalignment of the inductors of the three element system. At the same time use of a single inductor results in a considerable saving of space and weight which is of primary importance in airborne equipment.

In accordance with a preferred embodiment of the invention, a single energized saturable inductor, which is mounted with its magnetic axis inclined at a constant angle with its axis of spin, is rotated about its spin axis at a predetermined angular frequency which modulates the amplitude of the energizing potential applied to the inductor. A three branch network is connected to the output of the inductor and utilizes the output components thereof to measure the vertical and horizontal components of the earth's magnetic field and to measure the magnetic declination. Two of the branches include filter networks whereby one branch passes only the vertical components while the other branch passes only the horizontal components. The third branch includes a true north reference signal generator which is compared in a phase detector with the inductor signal occurring when the inductor is in the plane of the magnetic meridian.

The invention also contemplates another embodiment employing two inductors instead of a single inductor in order to obtain increased signal amplitude and physical separation of the field measuring frequencies. In this modification, the vertical component inductor is aligned parallel with the spin axis, and the horizontal component inductor is disposed in a plane perpendicular to the spin axis. The output of each inductor is fed to its respective recording channel, and the magnetic declination recording channel may be connected to the horizontal inductor.

Accordingly, it is an object of the present invention to provide a light, compact magnetometer which employs a single spinning inductor type detector.

Another object of the invention is to provide a system for detecting and measuring the horizontal and vertical components of the earth's magnetic field and the angle of magnetic declination.

A further object is to provide an electronic system for measuring the signal output of a single spinning inductor type magnetometer.

A still further object is to provide an accurate system for measuring the direction of the earth's magnetic field.

Other objects and many of the attendant advantages of this invention will be readily appreciated as the same becomes better understood by reference to the following detailed description when considered in connection with the accompanying drawings wherein.

Figure 1:
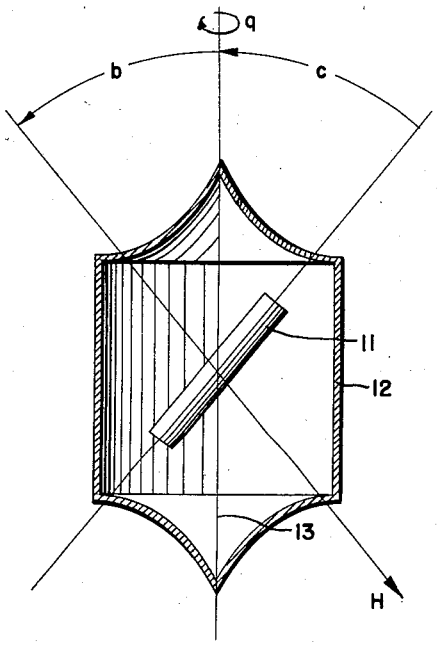
Fig. 1 shows the physical alignment of a spinning single inductor type detector which is one embodiment of the present invention.

Referring now to the drawings, wherein like reference characters designate like or corresponding parts throughout the several views, there is shown in Fig. 1 [which illustrates a preferred embodiment] a single saturable inductor 11 placed in an assembly 12 so that the magnetic axis of the inductor makes a constant angle $c$ with the spin axis 13 as the inductor is spun at a predetermined angular frequency $q$ about the spin axis. The inductor is excited by an external electrical oscillator with an A.-C. signal of frequency $p$. Purely for purposes of illustration and with the realization that other frequencies will provide equally satisfactory results, the excitation frequency $p$ has been selected as 2000 C. P. S. and the spin frequency $q$ as 40 C. P. S.

Figure 2:
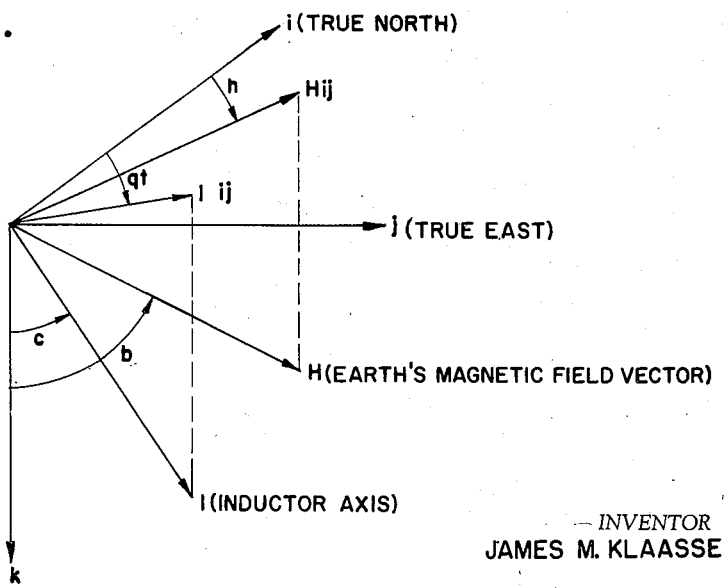
Fig. 2 is a vector diagram showing the geometrical arrangement of the magnetic components of the earth's field and the spinning inductor.

Referring now to Fig. 2, the inductor axis is represented by the unit vector $\underline{1}$ in a coordinate system of orthogonal unit vectors $\underline{i}$, $\underline{j}$, $\underline{k}$ in which $\underline{k}$ is taken as vertical downward, $\underline{i}$ is taken as true north, and $\underline{j}$ is true east. The unit vector specifying the instantaneous direction of the inductor's magnetic axis is thus defined by:

[1] $\quad \underline{1}_\phi = \sin c \cos qt\,\underline{i} + \sin c \sin qt\,\underline{j} + \cos c\,\underline{k}$ The earth's magnetic field vector $\underline{H}$ may be represented by the equation:

[2] $\quad \underline{H} = H\,[\sin b \cos h\,\underline{i} + \sin b \sin h\,\underline{j} + \cos b\,\underline{k}]$ where $b$ is the complement of the angle of magnetic dip and $h$ is the angle of magnetic declination.

The magnetic field applied along the inductor axis is expressed by the equation:

[3] $\quad \underline{H}\cdot\underline{1}_\phi = H\,[\sin b \sin c \cos qt \cos h +$ $\sin b \sin c \sin qt \sin h + \cos b \cos c]$ The inductor is excited with an alternating current of frequency $p$ and amplitude sufficient to saturate the core during successive half cycles. Since the even order harmonics of $p$ appearing in the inductor are dependent upon the magnetic field applied along the inductor axis, the value of the second harmonic, which is the largest even harmonic and hence the easiest to measure, is expressed by:

[4] $$e_{2p} = KH_\phi \cos 2pt$$

where K is a constant the value of which is dependent upon the type of inductor used and the second harmonic filter associated therewith as in conventional magnetometer circuits, $2p$ is the angular frequency of the second harmonic, and $H_\phi$ is the applied field. For the present purposes it is assumed that $e_{2p}$ is substantially independent of the amplitude of the excitation signal, a condition which may be realized by selection of the proper excitation level.

From Equations 3 and 4 it can be seen that:

[5] $$e_{2p} = KH \sin b \sin c \ [\cos qt \cos h + \sin qt \sin h]$$
$$\cos 2pt + KH \cos b \cos c \cos 2pt$$

It thus becomes apparent that $e_{2p}$ is a wave of carrier frequency $2p$ which is amplitude modulated at a frequency $q$, which is the frequency of rotation of the spinning inductor about the spin axis.

Using the trigonometric identity, $$\cos qt \cos h + \sin qt \sin h = \cos [qt-h]$$

and by allowing $\cos c = \sqrt{1-m^2}$, and $m = \sin c$ where $c$ and $m$ are constants, Equation 5 becomes:

[6] $$e_{2p} = KmH \sin b \cos [qt-h] \cos 2pt + KH$$
$$\sqrt{1-m^2} \cos b \cos 2pt$$

From Equation 6 it is obvious that the amplitude of the wave form for $e_{2p}$ consists of two components, one of which is a constant proportion to $H \cos b$, the vertical component of the earth's magnetic field, and the other of which is an A.-C. signal of frequency $q$, the amplitude of which is proportional to $H \sin b$, the horizontal component of the earth's magnetic field. From Equation 6 it can also be seen that the phase of the $q$ frequency component is dependent upon angle $h$, the magnetic declination of the earth's field.

Equation 6 may also be written as:

$$e_{2p} = KmH \sin b \ [\tfrac{1}{2} \cos [qt-h+2pt] + \tfrac{1}{2} \cos$$
$$[qt-h-2pt]] + KH\sqrt{1-m^2} \cos b \cos 2pt$$

from which may be obtained:

[7] $$e_{2p} = \tfrac{1}{2} KmH \sin b \cos [t[2p+q]-h] - \tfrac{1}{2} KmH \sin b$$
$$\cos [t[2p-q]+h] + K\sqrt{1-m^2} H \cos b \cos 2pt$$

Manifestly, from Equation 7, the wave form $e_{2p}$ may be considered to consist of three frequency components as follows:

| Frequency | Amplitude |
| --- | --- |
| $2p+q$ | $\tfrac{1}{2} KmH \sin b$ |
| $2p-q$ | $\tfrac{1}{2} KmH \sin b$ |
| $2p$ | $K\sqrt{1-m^2} H \cos b$ |

Figure 3:
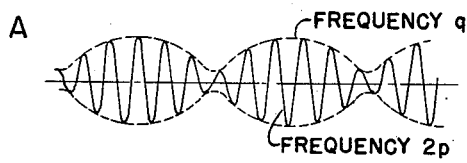
Fig. 3 shows the various wave form outputs of the spinning inductor for several angles of inclination of the inductor with respect to its spin axis.
Figure 3:
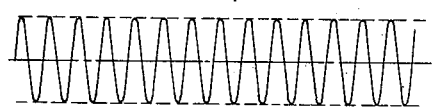
Figure 3:
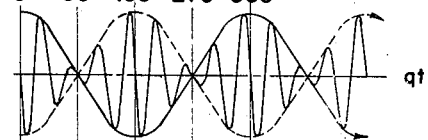
Figure 3:
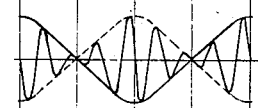
Figure 3:
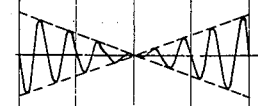
Figure 3:
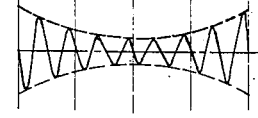

In Fig. 3 there is shown a series of wave forms representing the inductor output at various angles of spin, where A represents the general form of the inductor output whereas B through F are representative of special angles. B shows the inductor output when $b=0°$, in which $b$ is again the complement of the angle of magnetic dip; C shows the output for $b=c$ [the angle of spin] $=90°$; D indicates the output for $b=c$ and both angles lie between 45° and 90°; E represents the output where $b=c=45°$, and F is indicative of the output when $b=c$ and both angles lie between 0° and 45°.

Therefore, from the foregoing mathematical analysis it can be seen that the filtered output of the inductor which is electrically excited at a frequency $p$ and is spinning at a frequency $q$ may be represented by Equation 6 or Equation 7, and which includes data on the vertical component, horizontal component, and angle of declination of the magnetic field.

Figure 4:
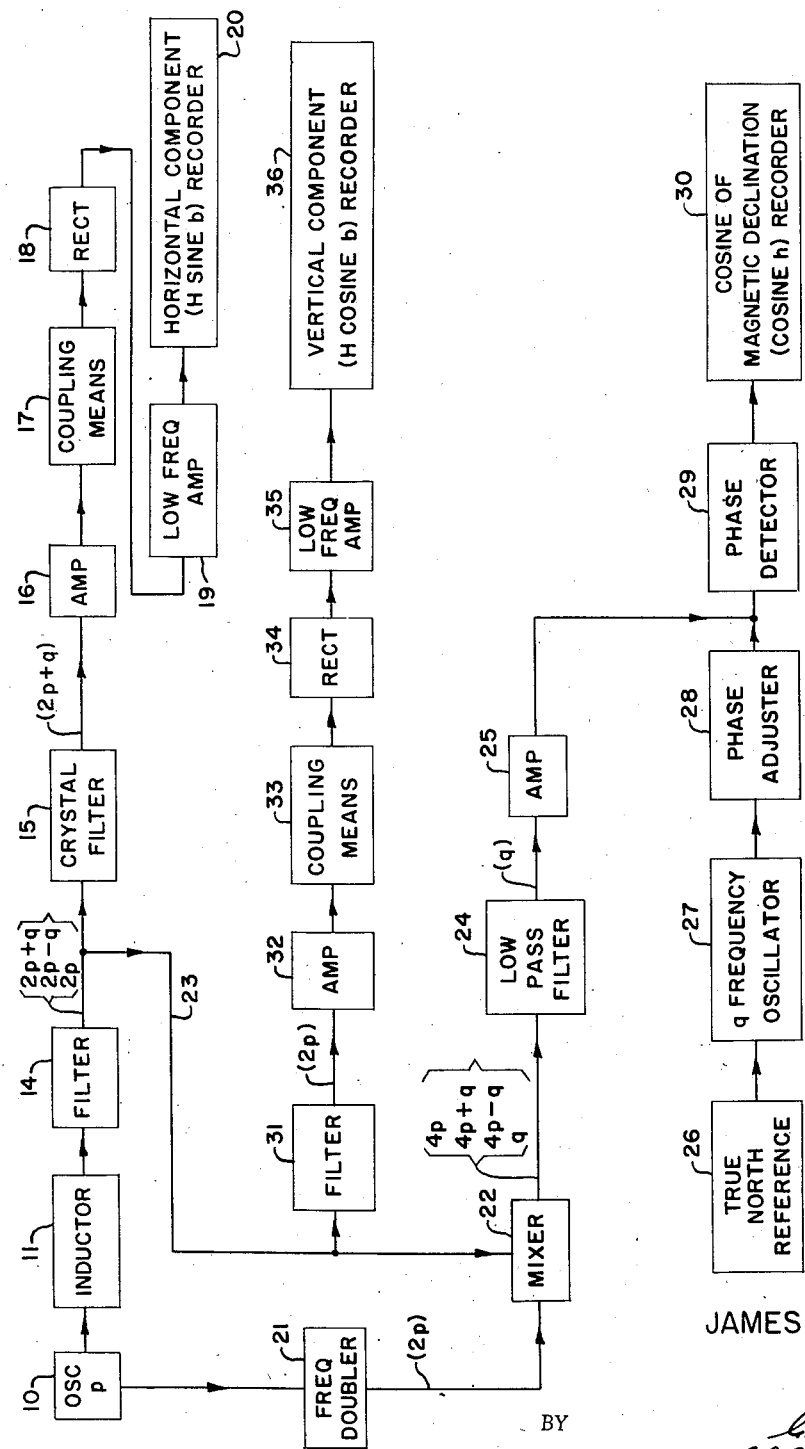
Fig. 4 illustrates in block diagram form the electronic system for making desired measurements of the output of the inductor.

Fig. 4 illustrates in block diagram the circuits for extracting these data by electronically separating and measuring:

[1] The amplitude of the second harmonic $[e_{2p}]$ which is $K\sqrt{1-m^2}H \cos b$, and therefore proportional to the vertical component of the earth's magnetic field;

[2] The magnitude of the upper side band $[2p+q]$ component, which is $\tfrac{1}{2} KmH \sin b$; and

[3] The phase of the $q$ frequency or ripple component.

These separating and measuring functions are accomplished by feeding the output of the inductor 11, which is excited from oscillator 10 with a source of energy of frequency $p$, to a filter 14 to produce an output as expressed by Equation 6 and which includes the second harmonic component $[2p]$ and the upper and lower sidebands $[2p+q]$ and $[2p-q]$, respectively. The signal output of the filter 14 is passed through a crystal filter 15 to eliminate the lower side band $[2p-q]$ and second harmonic $[2p]$ and to permit the upper side band $[2p+q]$ to be amplified by an amplifier 16. From the amplifier 16 the signal is fed through a coupling means 17 to a half-wave rectifier 18 which derives an unidirectional current proportional to the horizontal component $[H \sin b]$ of the earth's magnetic field. A low frequency amplifier 19 amplifies the rectifier output and feeds the half-wave signal to a recorder 20 to thereby measure the average value of the upper side band component which is proportional to $H \sin b$, the horizontal component of the earth's magnetic field.

A portion of the oscillator 10 output is passed through a frequency doubler 21 wherein is derived the second harmonic $[2p]$ which is applied to a mixer 22. The output of filter 14 is also applied, by way of conductor 23, to mixer 22 wherein the outputs of filter 14 and doubler 21 are combined to derive the sum and difference frequencies thereof consisting of the frequency components $[4p]$, $[q]$, $[4p+q]$ and $[4p-q]$. The circuit parameters of low pass filter 24, following the mixer, are selected to pass only the frequency component $q$ whose maximum occurs when inductor 11 is in the plane of the magnetic meridian, thereby producing a series of pulses of frequency $q$ in time coincidence with the instants of traversals of the magnetic meridian by inductor 11.

A true north reference device 26 [such as the axis of a directional gyro properly set] is employed to initiate a pulse signal each time the spinning inductor 11 passes through its azimuth or true north, thereby providing a sequence of pulses which drive an oscillator 27 having an oscillatory frequency of $q$ such that the maxima occur when the inductor 11 lies in the plane of the true north meridian.

Hence, we have two pulse series of $q$ frequency components, one series representing the magnetic plane meridian $q$ frequency and the other series representing the true north plane meridian $q$ frequency. These are fed to a phase detector circuit 29 so that the angle between the magnetic meridian and true north meridian [declination] is measured by the phase difference in these two signals. A phase adjustment stage 28 is provided to set the phase detector output to a maximum when the $\underline{i}$ vector and the magnetic meridian are known to coincide. The measured phase difference appearing in the output of detector 29 is utilized to drive a recorder 30 which records impressions corresponding to the cosine of magnetic declination $[\cos h]$.

The measurement of the vertical component is accomplished by the use of a narrow band filter 31 which is connected to pass only the second harmonic frequency $[2p]$ appearing in the output of filter 14. The passed second harmonic frequency signal is amplified by amplifier 32 and applied through coupling means 33 to a half-wave rectifier 34 wherein a half-wave unidirectional current correlative to the earth's magnetic field vertical component is derived from the second harmonic frequency. This unidirectional current is amplified in amplifier 35 and utilized to drive recorder 36 to record data indicative of and proportional to the earth's magnetic field vertical component [$H \cos b$].

Although the circuit described and illustrated in Fig. 4 is an exemplification of the invention, it is to be understood that more refined measurements of the vertical and horizontal components of the earth's magnetic field may be achieved by the use of calibrated D.-C. biases so arranged in adjunction with the recorders 20 and 36 as to measure only the varying residuals above datum levels of predetermined values. It is also to be understood that, in the magnetic declination recorder, supplementary devices may be employed to eliminate the quadrant ambiguities $\cos h = \cos [-h]$ and $$\cos [90°+h] = \cos [270°-h]$$

such devices being conventional and known to those skilled in the art.

Figure 5:
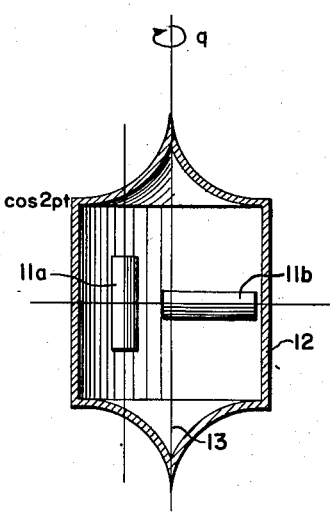
Fig. 5 illustrates another embodiment of the invention employing a pair of inductors.
Figure 5:
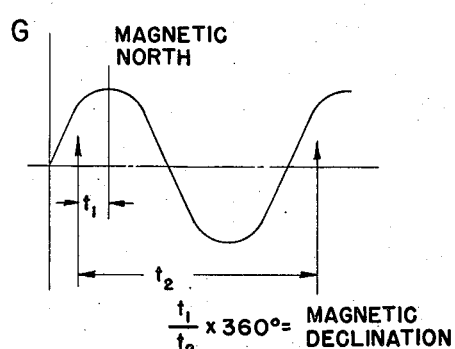

A second method for measuring the magnitude and direction of the earth's magnetic field is illustrated in Fig. 5 and utilizes two inductors, one of which, referred to as the vertical inductor 11$a$, is aligned parallel with the spin axis and therefor corresponds to the condition $c=0°$, and the other of which, referred to as the horizontal inductor 11$b$, lies in a plane perpendicular to the spin axis and thus represents the case in which $C=90°$.

The second harmonic voltage output of the vertical inductor 11$a$, $e_{2pv}$, may be obtained from Equation 6 where, under the present conditions, $m=0$:

[8] $\quad e_{2pv} = K_1 H \cos b \cos 2pt$

In a similar manner, the second harmonic of the horizontal inductor 11$b$ may be obtained from Equation 6 by setting $m=1$:

[9] $\quad e_{2ph} = K_2 H \sin b \cos [qt-h] \cos 2pt$

Hence it can be seen that the frequency components of the output of the two inductors are:

| Inductor | Frequency | Amplitude |
| --- | --- | --- |
| Horizontal | $2p+q$ | $\tfrac{1}{2}K_2H \sin b$ |
| Horizontal | $2p-q$ | $\tfrac{1}{2}K_2H \sin b$ |
| Vertical | $2p$ | $K_1H \cos b$ |

A comparison of these components with the output of the single spinning inductor discloses that the frequency components are the same in both cases but the amplitudes are somewhat greater in the two-inductor system. The two-inductor method also results in the physical separation of the field measuring frequencies since the magnitudes of the horizontal and vertical components of the earth's field are derived from separate inductors and thus the amplitudes of the frequencies obtained may be measured independently.

The two-inductor system also affords an indication of the inductor misalignment and therefore provides information to correct for this error. Lack of proper alignment of the two inductors causes the steady state harmonic voltage $e_{2pv}$ to be modulated, and adds a steady-state harmonic voltage to the output of the horizontal inductor $e_{2ph}$. The magnitudes of these unwanted voltages are proportional to the sine of the angle of misalignment and thus these magnitudes may be measured and a correction factor applied for adjusting the field component data.

The electronic measuring system shown in Fig. 4 is readily adaptable to the two-inductor system by feeding the output of each of the inductors to its respective recording channel to indicate the horizontal and vertical components of the earth's field, and the angle of declination may be obtained by connecting and feeding the horizontal inductor output to the phase comparing circuit of Fig. 4.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A magnetic field responsive device comprising, exciting coil means of saturable character mounted to be rotated about a spin axis, means for rotating said coil means at a predetermined rate, an alternating current supply circuit for said coil means, said supply circuit having a current of predetermined frequency and of sufficient amplitude to saturate the coil means on each half cycle whereby a number of harmonics of said frequency are produced and amplitude modulated at said predetermined rate in the exciting coil means output, means for filtering the exciting coil means output to pass a predetermined harmonic component so that the filtered output is a carrier frequency equal to said predetermined harmonic which is modulated at a rate corresponding to said predetermined rate, first circuit means including filtering means and unidirectional translating means responsive to a predetermined sideband of said filtered output for deriving a signal correlative to the horizontal component of the earth's magnetic field, second circuit means including filtering means and unidirectional translating means responsive to said carrier frequency for deriving a signal correlative to the vertical component of the earth's magnetic field, and means responsive to the outputs of said first and second circuit means for giving indications proportional to the horizontal and vertical components, respectively, of the earth's magnetic field.

2. The device of claim 1 and further including third circuit means responsive to said filtered output for obtaining an indication of the angle of magnetic declination, said third circuit comprising, means for generating reference pulses at the instant said exciting coil means is pointing true north, an oscillator responsive to said pulses for generating coincident impulses having a frequency corresponding to the angular frequency of said predetermined rate, means for deriving the maximum angular frequency signal of said predetermined rate from said filtered output, said maximum signal occurring when the exciting coil means is in the plane of the earth's magnetic meridian, phase-responsive means responsive to the phase relation between said impulses and said maximum angular frequency signal for producing a signal correlative to the angle of magnetic declination, and means responsive to the signal produced by said phase-responsive means for giving indications proportional to the angle of magnetic declination.

3. The device of claim 2, wherein said coil means is a single saturable inductor so mounted as to have its axis inclined at a constant predetermined angle with respect to said spin axis as said inductor is rotated.

4. The device of claim 2, wherein said coil means consists of a pair of saturable inductors, one being mounted with its axis parallel to said spin axis and the other being mounted with its axis perpendicular to said spin axis.

5. The combination of claim 1, further including means responsive to said filtered output for producing a pulse at the instant when the amplitude of said angular frequency is at a maximum, means for generating a reference impulse at a predetermined time reference, and means for comparing the phase of said reference impulse with respect to said pulse to thereby indicate the direction of the earth's magnetic field.

6. The combination of claim 5 wherein said coil means is a rotatable saturable inductor having its axis inclined at a constant angle with respect to said spin axis.

7. In a device for indicating the magnitude and direction of the earth's magnetic field, the combination comprising exciting coil means of saturable character mounted to be rotated about a spin axis, means for rotating said coil means at a predetermined angular frequency about said spin axis, an alternating current supply circuit for saturating said coil means on successive half cycles, said supply circuit having a current of predetermined frequency which appears in the coil means output as a plurality of harmonic frequency components that are amplitude modulated by said angular frequency, filter means for passing only a predetermined harmonic component as an amplitude modulated carrier frequency containing a plurality of sidebands, first circuit means including filtering and rectifying means responsive to only a predetermined one of said sidebands for developing a signal correlative to the horizontal component of the earth's magnetic field, means for developing a pulse at the instant said amplitude modulated carrier frequency is at a maximum, means for generating an impulse at a predetermined time reference, and means for comparing the phase of said impulse with respect to said pulse to thereby derive a signal indicating the direction of the earth's magnetic field.

8. The combination of claim 7, wherein the frequency of said pulse and impulse is said predetermined angular frequency.

9. In a device for indicating the magnitude and direction of the earth's magnetic field, the combination comprising exciting coil means of saturable character mounted to be rotated about a spin axis, means for rotating said coil means at a predetermined angular frequency about said spin axis, an alternating current supply circuit for saturating said coil means on successive half cycles, said supply circuit having a current of predetermined frequency which appears in the coil means output as a plurality of harmonic frequency components that are amplitude modulated by said angular frequency, filter means for passing only a predetermined harmonic frequency component as an amplitude modulated carrier frequency containing a plurality of sidebands, first circuit means including filtering means suppressing all of said sidebands and passing only said predetermined harmonic frequency component and rectifying means responsive to said filtered harmonic frequency component for developing a unidirectional signal proportional to the vertical component of the earth's magnetic field, means for developing a pulse at the instant the amplitude of said carrier frequency is at a maximum, means for generating an impulse at a predetermined time reference, and means for comparing the phase of said impulse with respect to said pulse whereby a signal indicative of the direction of the earth's magnetic field is produced.

10. A system for measuring the direction and magnitude of the earth's magnetic field comprising; a single spinning inductor of saturable character mounted to be rotated about a spin axis said inductor being so disposed as to have its axis inclined at a constant angle with respect to said spin axis as said inductor rotates; means for rotating said coil means at a predetermined angular frequency about said spin axis; an alternating current supply circuit for saturating said coil means on successive half cycles, said supply circuit having a current of predetermined frequency which appears in the inductor output as a plurality of harmonic frequency components that are amplitude modulated by said angular frequency; filter means for passing only the second harmonic component as an amplitude modulated carrier frequency having upper and lower sidebands; first circuit means including filtering and rectifying means responsive to only the upper sideband for developing a signal correlative to the horizontal component of the earth's magnetic field; second circuit means including filtering means suppressing said sidebands and passing only the second harmonic frequency component and rectifying means responsive to said filtered harmonic frequency component for developing a signal correlative to the vertical component of the earth's magnetic field; third circuit means including a mixer responsive to the output of said filter means and to the output of a frequency doubler which is energized from said alternating current supply circuit to derive sum and difference frequency signals, a narrow band pass filter having parameters of such values as to pass a pulse signal at said predetermined angular frequency only at the instant the inductor traverses the magnetic meridian of the earth's magnetic field, a normally deactivated oscillator adaptable upon activation to generate signals of said predetermined angular frequency, a true north reference circuit for generating a triggering pulse for said oscillator at the instant said inductor passes through true north whereby said oscillator is activated to generate an impulse having a frequency equal to said predetermined angular frequency, and phase-responsive means responsive to the phase relation between said impulse and said pulse signal for developing a signal correlative to the angle of magnetic declination; and means responsive to the developed signals of said first, second and third circuit means for giving indications proportional to the horizontal and vertical components of the earth's magnetic field and to the magnetic declination, respectively.

11. A magnetometer which comprises a means for producing a complex electrical wave containing a plurality of signals correlative with the magnitude of the components of the earth's magnetic field, means for rectifying a first of said signals, means for measuring the value of said rectified signal to thereby measure one of the components of the earth's magnetic field, means for rectifying a second of said signals, means for measuring the value of said second rectified signal to thereby measure another of the components of the earth's magnetic field, means for producing a sharp pulse at the instant said second signal is a maximum, means for generating a marker pulse at a predetermined time reference, and means for comparing the phase of said marker pulse with respect to said sharp pulse to thereby indicate the direction of the earth's magnetic field.

12. A magnetometer which comprises means for producing a complex electrical wave containing a plurality of signals correlative with the magnitude of the components of the earth's magnetic field, a first means for measuring the average value of a first of said signals to thereby measure one of the components of the earth's magnetic field, a second means for measuring the average value of a second of said signals to thereby measure another of the components of the earth's magnetic field, means for producing a sharp pulse at the instant said second signal is a maximum, means for generating a marker pulse at a predetermined time reference, and means for comparing the phase of said marker pulse with respect to said sharp pulse to thereby indicate the direction of the earth's magnetic field.

References Cited in the file of this patent

UNITED STATES PATENTS

| 2,555,209 | Vacquier et al. | May 29, 1951 |
| 2,564,854 | Muffly | Aug. 21, 1951 |
| 2,598,284 | Muffly | May 27, 1952 |
| 2,598,285 | Muffly | May 27, 1952 |
| 2,615,961 | Means | Oct. 28, 1952 |